US007014023B1

(12) United States Patent
Gauthier

(10) Patent No.: US 7,014,023 B1
(45) Date of Patent: Mar. 21, 2006

(54) NO-PLAY RATCHET CONSTRUCTION

(75) Inventor: Michael T. Gauthier, Oak Creek, WI (US)

(73) Assignee: Gauthier Biomedical, Inc., Brown Deer, WI (US)

( * ) Notice: Subject to any disclaimer, the term of this patent is extended or adjusted under 35 U.S.C. 154(b) by 6 days.

(21) Appl. No.: 10/825,384

(22) Filed: Apr. 15, 2004

Related U.S. Application Data

(60) Provisional application No. 60/463,529, filed on Apr. 17, 2003.

(51) Int. Cl.
F16D 41/16 (2006.01)
B25B 13/46 (2006.01)

(52) U.S. Cl. .............................. 192/43.1; 192/46; 81/62
(58) Field of Classification Search ............... 192/43.1, 192/46; 81/62, 63.1
See application file for complete search history.

(56) References Cited

U.S. PATENT DOCUMENTS

| 2,720,296 | A | | 10/1955 | Anton |
| 2,867,144 | A | | 1/1959 | Stevens |
| 2,893,278 | A | | 7/1959 | Rice |
| 3,654,975 | A | | 4/1972 | Ballsmith et al. |
| 4,466,523 | A | | 8/1984 | De Carolis et al. |
| 4,529,071 | A | * | 7/1985 | Gagnon et al. ............ 192/43.1 |
| 4,597,478 | A | * | 7/1986 | Bodnar ....................... 192/43.1 |
| 5,437,212 | A | | 8/1995 | Thompson et al. |
| 5,520,073 | A | | 5/1996 | Bakula et al. |
| 5,535,648 | A | | 7/1996 | Braun et al. |
| 5,551,323 | A | | 9/1996 | Beere et al. |
| 5,613,585 | A | | 3/1997 | Tiede |
| 5,619,891 | A | | 4/1997 | Tiede |
| 5,622,089 | A | | 4/1997 | Gifford, Sr. |
| 5,647,252 | A | | 7/1997 | Miner |
| 5,738,192 | A | | 4/1998 | Miner |
| 5,749,272 | A | | 5/1998 | Phan |
| 5,771,760 | A | | 6/1998 | Tiede |
| 5,778,743 | A | | 7/1998 | Tiede |
| 5,848,680 | A | | 12/1998 | Rinner |
| 5,910,196 | A | | 6/1999 | Huang |
| 5,921,158 | A | * | 7/1999 | Slusar et al. .................... 81/63 |
| 5,928,154 | A | | 7/1999 | Silber et al. |
| 5,943,755 | A | | 8/1999 | Gauthier et al. |
| 6,047,617 | A | * | 4/2000 | Chen ........................... 81/63.1 |
| 6,059,083 | A | | 5/2000 | Tseng |
| 6,082,226 | A | | 7/2000 | Lin |
| 6,260,446 | B1 | | 7/2001 | Hu |
| 6,305,248 | B1 | | 10/2001 | Rowlay |
| 6,644,147 | B1 | * | 11/2003 | Huang ........................... 81/62 |
| 6,658,970 | B1 | | 12/2003 | Shiao |
| 6,817,458 | B1 | * | 11/2004 | Gauthier .................... 192/43.1 |

* cited by examiner

Primary Examiner—Richard M. Lorence
(74) Attorney, Agent, or Firm—Boyle Fredrickson Newholm Stein & Gratz, S.C.

(57) ABSTRACT

The present invention is an improved ratcheting mechanism for a tool that includes a number of bearings disposed within the mechanism that maintain the alignment of a gear forming a part of the mechanism with the remainder of the parts of the mechanism. The bearings are disposed within a housing for the mechanism and serve to align and allow the free rotation of a shaft connected to the gear. The bearings, by maintaining the alignment of the shaft and gear with the remainder of the mechanism, prevent the gear from experiencing any lateral or axial displacement with respect to the remainder of the mechanism. Further, the various components of the mechanism are effectively sealed to the housing in order to provide a fluid tight mechanism for use in a variety of different applications.

19 Claims, 4 Drawing Sheets

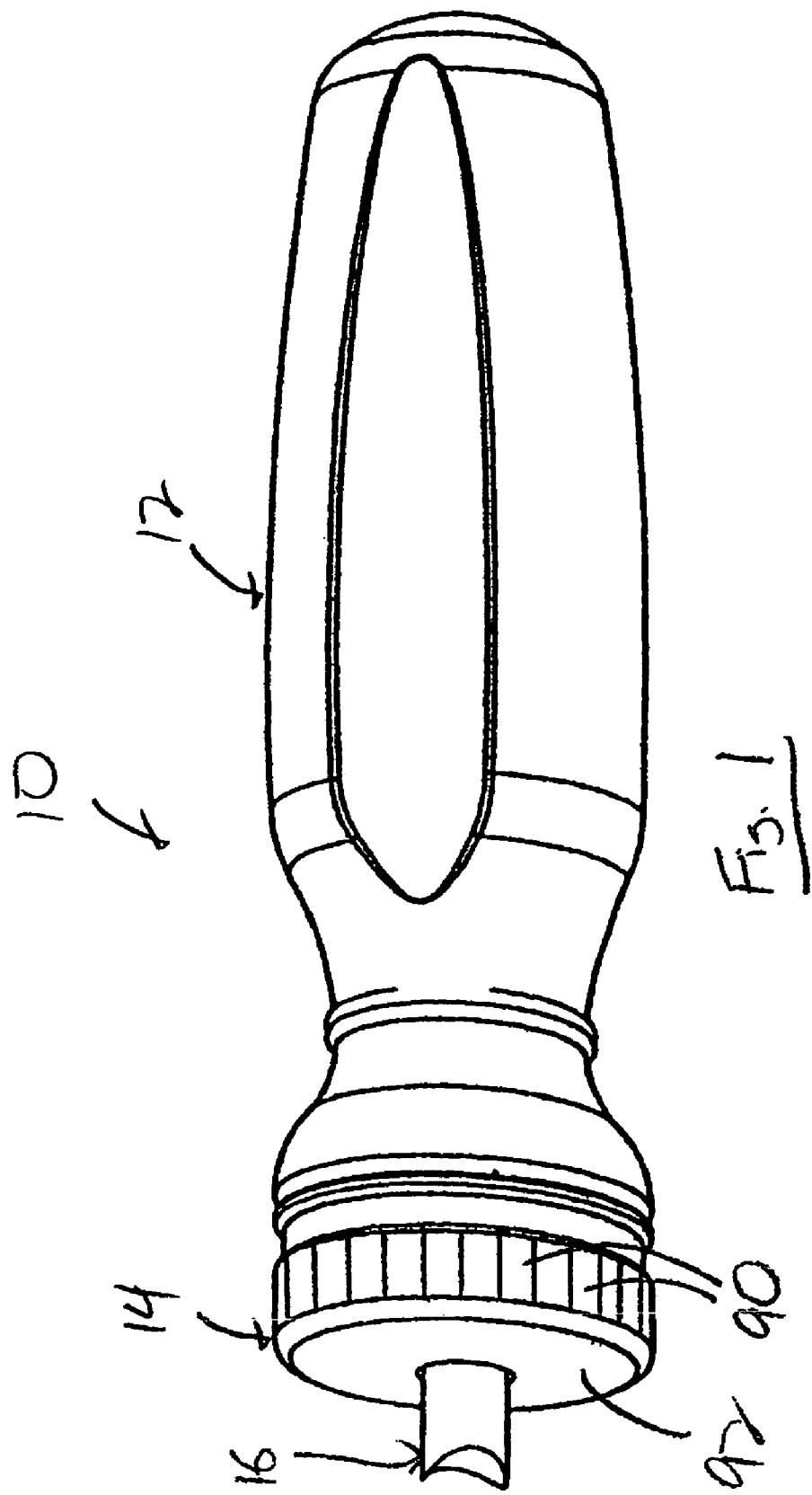

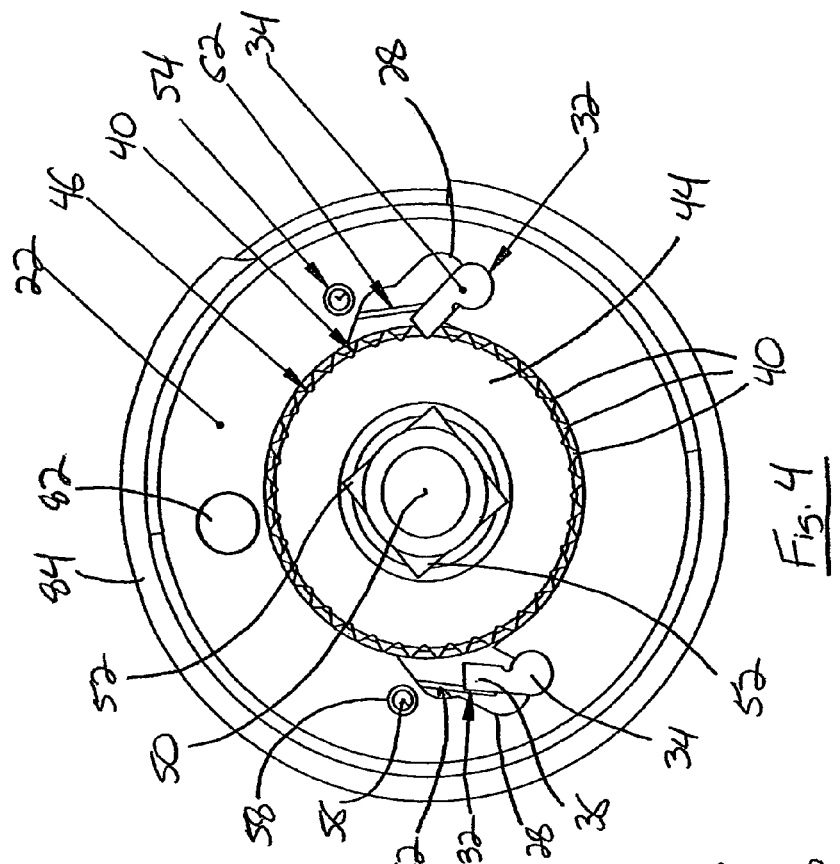
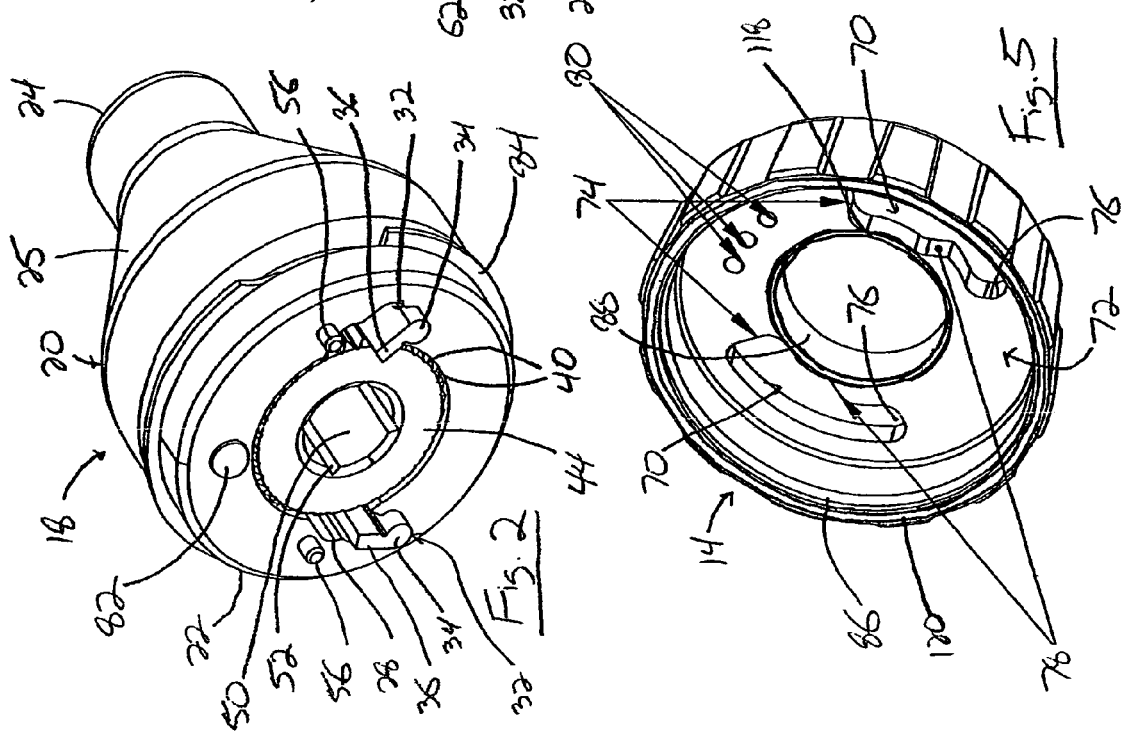

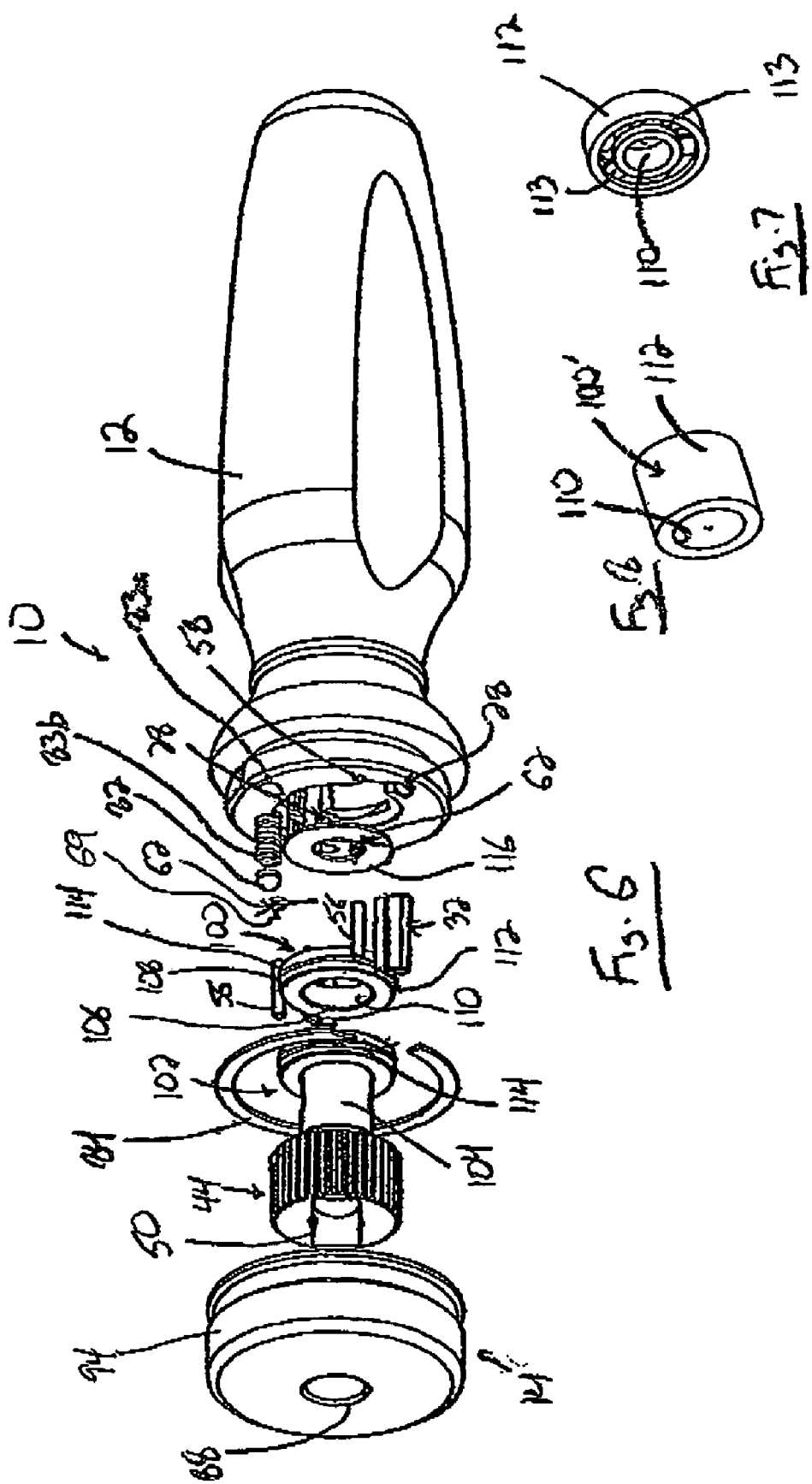

NO-PLAY RATCHET CONSTRUCTION

CROSS-REFERENCE TO RELATED APPLICATION

This application claims priority from U.S. Provisional Application Ser. No. 60/463,529, filed Apr. 17, 2003.

FIELD OF THE INVENTION

The present invention relates to hand tools, and more specifically to tools including a ratcheting mechanism in order to control rotation of the tool when in use.

BACKGROUND OF THE INVENTION

When tightening a fastener such as a nut or bolt, the type of tool that is often utilized is a tool including a ratcheting mechanism. The ratcheting mechanism enables the tool to be rotated in only a single direction, such that the tool can be easily manipulated by an individual to quickly and effectively tighten the nut or bolt the desired amount.

However, in certain applications the degree to which the fastener is tightened must be closely controlled in order to avoid any over-tightening. One particularly relevant application in which this type of control is required is in the medical field where screws and other types of fasteners are inserted directly into an individual to speed the healing of a particular injured body part of an individual, e.g. a broken bone. By precisely tightening the fasteners, the physician can provide the most effective treatment for the individual without causing any further damage to the individual or inadvertently slowing the healing process.

However, while the ratchet tools currently used in the medical field and in other areas are capable of tightening screws and other fasteners, any prior art ratchet tools suffer from a number of problems that prevent the tools from being utilized most efficiently. One problem is that often times it is difficult for an individual using the ratchet tool to determine when the fastener is tightened to the proper amount based as a result of the construction of the ratchet tool. More specifically, most ratchet tools have a "sloppy feel" as a result of their design, which prevents an individual from feeling the resistance exerted on the tool by the fastener in order to accurately determine when the fastener is properly tightened. Also, when external attachments or shaft couplers are connected to the tool, the loss of feel when utilizing the tool is compounded.

Further, another problem associated with prior art ratchet tools arises due to the positioning of the central gear within the tool. More particularly, when the tool has been used for a certain amount of time, the central gear in the ratcheting mechanism tends to move out of concentricity with the handle of the tool, such that the gear "runs out" with regard to the handle, thereby limiting the effectiveness of the tool.

Finally, another shortcoming of the prior art ratchet tools arises because tools utilized in medical scenarios must be sterilized between uses. Based on the open construction of prior art tools, the use of cleaning solutions to sterilize tools of this type often times cannot adequately clean the internal portions of the tool such that the tool retains dirt or other debris, including residual cleaning fluid, within the interior of the mechanism which can significantly affect the ability operation of the tool to be used.

Therefore, to remedy these problems it is desirable to develop a ratchet tool for use in a variety of situations where the tool has a ratchet mechanism construction that provides adequate feel of the resistance of the fastener to the individual utilizing the tool through the tool. The improved ratchet tool construction should also effectively prevent any run out of the central gear with respect to the tool, while also effectively sealing off the interior of the tool from the exterior of the tool such that no fluid, gas or debris can get into the tool and affect the operation and/or usefulness of the tool.

SUMMARY OF THE INVENTION

According to a primary aspect of the present invention, a tool including a ratcheting mechanism is provided in which the ratcheting mechanism includes a central gear that is rotatably mounted within a recess formed by a housing for the mechanism in a manner which prevents the gear from shifting axially or laterally with respect to the housing. The mechanism includes a shaft operably connected to the gear and located at least partially within the housing for the tool. The shaft supports the central gear, which defines a central opening, into which a shaft extender or other device can be inserted, and has a number of teeth spaced around the periphery thereof. The shaft and the gear are maintained in position within the housing by a pair of bearings positioned around the shaft adjacent the gear and engaged with the housing opposite the shaft. The bearings include a smooth or otherwise essentially frictionless interior surface that is contacted by the shaft in order to enable the shaft to rotate freely with respect to each of the bearings. On the outer surface of the bearings, each bearing can include a sealing member that is engaged with the housing to both secure the bearing with regard to the housing, thereby preventing the bearings and shaft positioned within the bearings from shifting with regard to the housing during the operation of the tool, and to seal the interior of the housing inwardly from the bearings. Thus, the gear which is attached to the shaft is prevented from shifting laterally or axially within the housing.

Because the gear is maintained in both a lateral and axial position with respect to the housing, the gear is maintained in proper alignment with a pair of pawls also disposed within the housing and selectively engageable with the teeth on the exterior of the gear. Upon selectively engaging one or the other of the pawls with the gear, the rotation of the gear and the shaft can be controlled or directed in either a counterclockwise or clockwise direction as desired when operating the tool.

According to another aspect of the present invention, the ratcheting mechanism also includes a cap engageable with the housing over the recess in which the mechanism is located that includes a central aperture aligned with the central opening in the gear. The cap includes a sealing member disposed along the periphery of the central aperture that sealingly engages the gear around the central opening in order to provide a fluid tight seal therebetween. The cap also engages a sealing surface disposed on the exterior of the housing around the recess on which another sealing member can be positioned in order to provide a fluid tight seal between the housing and the cap. Therefore, when cleaning the tool after use or using the tool in environments where fluids are present, the fluids are prevented from penetrating into the interior of the housing. As a result, no liquid, gas, debris or residual cleaning material is able to affect the normal operation of the mechanism.

According to still another aspect of the present invention, the mechanism can include a number of bearings disposed within the recess and around the shaft depending on the torque to be applied using the tool. In situations where the torque to be applied is minimal, only one bearing may be necessary to prevent any run out of the central gear with respect to the housing. However, in situations where the tool is used to apply more torque to a fastener in order to tighten or remove the fastener, additional bearings may be positioned within the recess to maintain the position of the gear within the mechanism even with the increased torque applied from the tool.

Numerous other aspect, features and advantages of the present invention will be made apparent from the following detailed description taken together with the drawing figures.

BRIEF DESCRIPTION OF THE DRAWINGS

The drawings illustrate the best mode currently contemplated of practicing the present invention.

In the drawings:

FIG. 1 is an isometric view of a tool incorporating the ratcheting mechanism of the present invention;

FIG. 2 is a perspective view of the housing and ratcheting mechanism of the tool of FIG. 1;

FIG. 4 is a front plan view of the housing and ratcheting mechanism of the tool of FIG. 1;

FIG. 5 is a rear perspective view of the cap of the tool of FIG. 1;

FIG. 6 is an exploded, perspective view of the tool of FIG. 1.

FIG. 7 is an isometric view of a second embodiment of a bearing used in the ratcheting mechanism of FIG. 1; and FIG. 8 is an isometric view of a third embodiment of a bearing used in the ratcheting mechanism of FIG. 1.

DETAILED DESCRIPTION OF THE INVENTION

Figure 3:
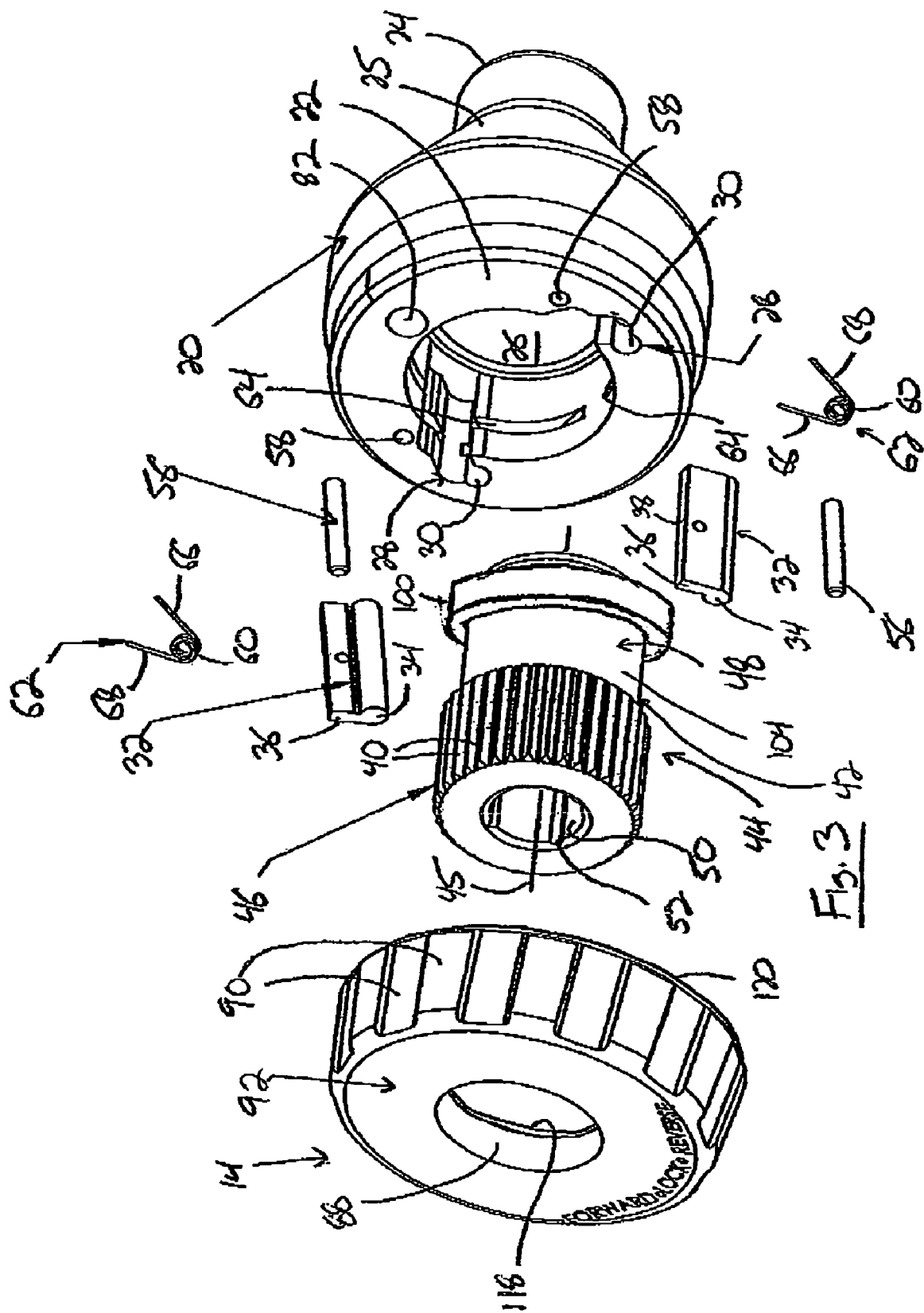
FIG. 3 is an exploded, perspective view of the housing, ratcheting mechanism and cap of the tool of FIG. 1.

With reference now to the drawing figures in which like reference numerals designate like parts throughout the disclosure, a hand-held tool for positioning a fastener with respect to an object is indicated generally at 10 in FIG. 1. The tool 10 includes a handle 12 that is formed of a generally rigid material that is easily gripped by an individual utilizing the tool 10, such as a metal, a wood, or a hard plastic. The handle 12 is connected to an implement 16 at one end that extends outwardly through a cap 14 rotatably connected to the handle 12 around the implement 16. The implement 16 can be any suitable type of instrument utilized to remove, adjust or tighten a fastener (not shown), such as a Phillips or flathead screwdriver implement, or a ratchet head implement, as is known in the art.

Referring now to FIGS. 2–5, the tool 10 includes a ratcheting mechanism 18 that is disposed within a housing 20. The housing 20 can be formed separately of the same or a similar material as the handle 12, but can also be formed integrally with the handle 12 in a preferred embodiment by machining the various openings formed in the housing 20 directly into the handle 12. In the embodiment where the housing 20 is formed separately from the handle 12, the housing 20 includes a wide first end 22, and a narrow second end 24 joined by a tapering, conical wall 25 which is positioned within the handle 12 and is used to secure the housing 20 to the handle 12. The housing 20 can be fixed to the handle 12 using any suitable means, such as a mechanical fastener (not shown), an adhesive, or any suitable bonding technique such as thermal or sonic welding depending upon the types of materials used to form the handle 12 and the housing 20. Alternatively, the housing 20 can be formed integrally with the handle 12 with the recess having wide end 22 and narrow end 24 formed therein.

The wide end 22 includes a generally circular central opening 26 that extends inwardly into the housing 20 towards the narrow end 24. A pair of elongate slots 28 are disposed on opposite sides of the opening 26 and extend generally radially and tangentially outwardly from the opening 26. However, the slots 28 can also be offset from one another such that the slots 28 are not aligned or positioned as mirror images of each other. Each slot 28 defines a nesting portion 30 opposite the central opening 26 that is generally circular or arcuate in shape, and circumscribes an arc of greater than 180°. More preferably, the nesting portion 30 encompasses an arc of greater than 200° but not more than 250° to allow for sufficient movement within the portions 30.

The shape of each nesting portion 30 is designed to pivotally receive and securely retain a pawl 32 therein. The pawls 32 are generally elongate members formed of a rigid material, such as a metal or hard plastic, that include a stem 34 having a generally circular cross-section and a diameter slightly less than the inner diameter of the nesting portion 30. The pawls 32 further include an arm 36 extending outwardly from the stem 34 and having a length sufficient to extend from the nesting portion 30 through the remainder of the slots 28 and into the central opening 26. The arm 36 is generally rectangular in shape and includes an outer end 38 that is positionable within the central opening 26. The overall length of the pawl 32 is such that when the pawls 32 are inserted fully into each slot 28 within the housing 20, a portion of each pawl 32 is positioned outwardly of the housing 20 such that the pawls 32 can be engaged by the cap 14 in a manner to be described.

The outer end 38 of the arm 36 of each pawl 32 is positionable within the central opening 26 in order to engage one of a number of teeth 40 disposed on an outer surface 42 of a gear 44 rotatably disposed in the opening 26. The teeth 40 are formed of a size sufficient to enable the gear 44 to be rotated through an angle of about 10° in order to move the width of a single tooth 40. Therefore, the size of the teeth 40 allows for very small movements of the gear 44 with respect to the housing 20 providing a "smooth" feel to the tool 10 so that a fastener engaged by the tool 10 can be very precisely adjusted. Also, because the smaller size for the teeth 40 enables the teeth 40 to be positioned further from a central axis 45 of the gear 44, less stress or force is applied directly to the interface of the pawls 32 and the teeth 40, lessening the chance of the pawls 32 slipping over the teeth 40.

The gear 44 is generally cylindrical in shape including a first section 46 of the outer surface 42 on which the teeth 40 are disposed, and a second section 48. As best shown in FIG. 3, the outer diameter of the first section 46 of the gear 44 defined by the teeth 40 is slightly less than the inner diameter of the central opening 26, such that the gear 44 can rotate freely within the central opening 26 without interference from the housing 20. The gear 44 further defines a central aperture 50 extending into and through the first portion 46, and including a number of spaced grooves 52 that extend the length of the aperture and which are adapted to receive and engage complementary ridges (not shown) disposed on the implement 16 in order to securely hold the implement 16 within the gear 44 and prevent slipping of the implement 16 with respect to the gear 44.

The gear 44 is effectively prevented from rotating within the central opening 26 of the housing 20 by the engagement of the pawls 32 with the teeth 40 on the gear 44. The pawls 32 are biased into engagement with the teeth 40 by a pair of biasing members 54 disposed on opposite sides of the central opening 26 adjacent each slot 28. Each of the biasing members 54 preferably includes a generally cylindrical pin 56 formed of a rigid material that is inserted into an elongate pin hole 58 located in the housing 20 adjacent each slot 28. The length of each pin 56 is similar to the length of each pawl 32, such that when the pins 56 are inserted into the holes 58, the pins 56 extend outwardly from the housing 20 a short distance.

Each pin 56 is inserted through a central, looped portion 60 of a torsion spring 62 in order to anchor the spring 62 within the housing 20. While the spring 62 is a preferred biasing element for use in the biasing members 54, other suitable elements can also be used, such as a resilient, deformable plastic member, or a leaf spring, among others. To anchor the spring 62, the central section 60 is inserted into the pin hole 58 for engagement by the pin 56 through a channel 64 that extends between and intersects both the pin hole 58 and the slot 28. Thus, a first leg 66 of the spring 62 is positioned along the channel 64 between the pin hole 58 and slot 28, while a second leg 68 is biased outwardly by the central portion 60 and first leg 66 into engagement with the pawl 32 as best shown in FIG. 4. The engagement of the second leg 68 with the pawl 32 maintains the outer end 38 of the arm 36 in engagement with the teeth 40 on the gear 44 to prevent rotation of the gear 44 in a direction toward the respective pawl 32. Further, in a second embodiment of the spring 62, as shown in FIG. 6, the first leg 66 and second leg 68 can be oriented on the central section 60 to extend outwardly from the central section 60 at an angle of approximately 90° with respect to one another. The increased angular distance between the first leg 66 and second leg 68 allows for an increase in the range and strength of the biasing force exerted by the spring 62 on the arm 38 of the pawl 32 to even further prevent slippage of the pawl 32 with respect to the teeth 40. The first leg 66 may also include a tab 69 disposed opposite the central portion 60. The tab 69 is insertable into an opening (not shown) in the channel 64 adjacent the nesting portion 30 of the slot 28 in order to ensure the proper positioning of the central portion 60 of the spring 62 within the pin hole 58 to allow easy insertion of the pin 56 through the central portion 60.

Referring now to FIG. 5, the pawls 32 are maintained in or disengaged from the teeth 40 on the gear 44 by one of a pair of recesses 70 disposed on an interior surface 72 of the cap 14. Each recess 70 has a wide end 74, and a narrow end 76 that are separated by an inwardly extending ridge 78. The portion of each pawl 32 extending outwardly from the slots 28 is positioned within one of the recesses 70 on the cap 14 when the cap 14 is secured to the housing 20. When the cap 14 is rotated over the housing 20 such that a ridge 78 of one of the recesses 70 comes into contact with the adjacent pawl 32, the pawl 32 is urged out of the central opening 26 away from the teeth 40 against the bias of the biasing member 54 to a disengaged position, as shown best in FIG. 4. In this position, the gear 44 is allowed to rotate in a direction toward the disengaged pawl 32, as the opposite pawl 32 is configured to allow rotation in this direction, but to prevent any rotation in the opposite direction.

In order to assist an individual in properly positioning the cap 14 to enable the recesses 70 on the cap 14 to control the rotation of the gear 44 in one direction or the other, the cap 14 includes a number of depressions 80 disposed between the pair of recesses 70. Each of the depressions 80 is engageable with a spring-biased detent 82 positioned on the housing 20 between the pin holes 58. When the cap 14 is rotated, the detent 82 is compressed inwardly into an opening 83a disposed in the housing 20 that retains the detent 82 such that the cap 14 can rotate above the detent 82. However when one of the depressions 80 is positioned in alignment with the detent 82, a spring 83b positioned within the opening 83a between the housing 20 and the detent 82 urges the detent 82 outwardly into engagement with the depression 80. The cap 14 is thus held in this position until such time as a sufficient force is applied by an individual to the cap 14 to disengage the depression 80 from the detent 82. Further, to prevent the cap 14 from being rotated past the outermost depressions 80, the wide end 74 of each recess 70 is configured to engage the outwardly extending end of each pin 56 which functions as a stop for the rotation of the cap 14 with respect to the housing 20.

The cap 14 can be rotatably secured to the exterior of the housing 20 in any conventional manner, but as shown in FIGS. 2 and 4, is preferably secured to the housing 20 by the engagement of a circumferential clip 84 disposed on the exterior of the wide end 22 of the housing 20 with a corresponding groove 86 disposed on the interior surface 72 of the cap 14. The engagement of the clip 84 and the groove 86 enables the cap 14 to rotate with respect to the housing 20 as necessary without disengaging the cap 14 from the housing, unless desired. Further, by engaging the clip 84 within the groove 86, a central opening 88 defined in the cap 14 is positioned in alignment with the central aperture 50 of the gear 44. Thus, the implement 16 can be inserted through the opening 88 in the cap 14 and into engagement with the aperture 50 in the gear 44 in order to be utilized with the ratcheting mechanism 18 of the tool 10. Also, to assist in rotating the cap 14, the cap 14 can be formed of any suitable material, such as a metal or a suitably rigid plastic, that can have added grip enhancements, such as knobs (not shown) or other high friction structures, or materials. However, preferably, the cap 14 includes a number of grooves 90 on the exterior surface 92 of the cap 14 that facilitate the gripping of the cap 14 by an individual and most preferably the exterior surface 92 of the cap 14 includes a knurled portion 94 as shown in FIG. 6.

Further, referring now to FIGS. 3 and 6, a pair of bearings 100 and 102 are positioned around a shaft 104 affixed to the gear 44. The shaft 104 can be formed separately from or integrally with the gear 44 and extends outwardly from the gear 44 into the housing 20 of the handle 12. The bearings 100 and 102 are positioned around the shaft 104 and have an outer diameter sufficient to engage the wide end 22 of the housing 20. Each bearing 100 and 102 is generally circular in shape and defines a central opening 106 therein through which the shaft 104 extends. However, depending on the shape of the housing 20, the bearings 100 and 102 can have shapes that are non-circular to assist in maintaining the position of the bearings 100 and 102 with respect to the housing 20. For example, the outer surface of each bearing 100 and 102 can be square or triangular as desired, with the central circular opening 106 formed therein.

The bearings 100 and 102 define an outer housing engaging surface 108 opposite the opening 106 in an inner engaging surface 110 forming the periphery of the opening 106. The inner engaging surface 110 is essentially a frictionless surface that allows the shaft 104 to rotate freely with respect to the bearings 100 and 102 without any interference with the rotation of the shaft 104. The inner engaging surface 110 can be formed as a smooth metal ring 112, optionally with a lubricating member (not shown) positioned within the ring 112 of with a lubricant formed within the ring 112, such as a powdered metal bearing a lubricant imbedded within the powdered metal. However, the bearings 100 and 102 can also take the form of any other suitable frictionless bearing surface such as bearing including caged roller balls or pins 113, shown in FIG. 7, or a molded bearing 100' formed from a plastic material having a very low coefficient of friction, shown in FIG. 6, among other suitable bearing configurations.

The outer engaging surface 108 has an outer diameter sufficient to enable the outer surface 108 to securely engage the central opening 26 in the wide end 22 to form a seal therebetween. The seal can be facilitated by the placement of a retaining ring or sealing member 114 around the exterior of the outer engaging surface 108, whereby the sealing member 114 can be formed from a wave washer, plastic ring, or rubber O-ring or combinations thereof, among other suitable members. The engagement of the sealing member 114 with the housing 20 prevents any debris or fluid material from passing the bearings 100 and 102 into the housing 20.

In order to properly position the bearings 100 and 102 within the housing 20, a washer 116 inserted into the narrow end 24 of the housing 20 prior to the placement of the bearings 100 and 102 within the housing 20. The washer 116 is formed of a generally rigid material and functions as a stop or limit for the interior placement of the bearings 100 and 102 within the housing 20. Alternatively, or in addition to the washer 116, the bearings 100 and 102 can be secured within the housing 20 through the use of a suitable adhesive applied on the interior of the housing 20 and securing the outer engaging surface 108 of each bearing 100 and 102 to the housing 20. Depending upon the particular type of adhesive utilized, the adhesive can also function as the sealing member 114 and preventing any debris or liquid material from passing between the bearings 100 and 102 and the housing 20. However, depending upon the size of the bearings 100 an 102 and/or sealing members 114 utilized with the particular housing 20, the bearings 100 and 102 can simply be press fit into the housing 20 with the engagement between the bearings 100 and 102 and the housing 20 forming a fluid impermeable seal therebetween. Further, the bearings 100 and 102 can be different in sizes or shapes based on the interior shape of the housing 20. The only constant is that the central openings 106 in each bearing 100 and 102 be concentrically aligned with one another and with the housing 20.

With the bearings 100 and 102 positioned within the housing 20, when the shaft 104 of the gear 44 is inserted through the openings 106 in each of the bearings 100 and 102 during assembly of the tool 10, the bearings 100 and 102 function to align and maintain the gear 44 in a concentric position with regard to the housing 20. Therefore, during operation of the tool 10, the gear 44 is maintained in alignment with the handle 12 in housing 20 such that no axial or lateral displacement of the gear 44 can occur. Further, depending upon the particular configuration of the tool 10, the number of bearings 100 and 102 can be increased or decreased, and the placement of the bearings 100 and 102 within the housing 20 can be altered to space the bearings closer to, or further apart from one another, as well as on opposite sides of the gear 44 depending upon the particular configuration of the gear 44. For example, in a configuration for the gear 44 where the shaft 104 extends outwardly from both sides of the gear 44, bearings may be positionable on opposite sides of the gear 44 within the housing 20 in order to provide the alignment function for the gear 44 within the housing 20.

Referring now to FIG. 5, in order to maintain the fluid tight seal around the housing 20, the cap 14 also includes a sealing member 118 around the inner periphery of the central opening 88 defined in the cap 14. The sealing member 118 effectively engages the periphery of the gear 44 around the central aperture 50 in the gear 44. Thus, the interior of the housing 20 is affectively sealed against any fluid or debris entering the housing 20 by the engagement of the sealing member 118 with the gear 44. Further, the cap 14 can also include an additional sealing member 120 positioned on the interior of the open end of the cap 14 and engageable with the exterior of the wide end 22 of the housing 20. The engagement of this sealing member 120 between the wide end 22 and the selector cap 14 effectively prevents the entrance of any fluid material between the cap 14 and the wide end 22 of the housing 20, thereby maintaining the interior of the housing 20 free from fluid and other debris which might otherwise collect within the housing 20 and interfere with the operation of the ratcheting mechanism.

Various alternatives are contemplated as being within the scope of the following claims particularly pointing out and distinctly claiming the subject matter regarded as the invention.

I claim:

1. A ratchet mechanism comprising:
   A) a housing;
   B) a gear disposed within the housing;
   C) a shaft operably connected to the gear and extending into the housing;
   D) at least one pawl disposed at least partially within the housing and selectively engageable with the gear; and
   E) at least one bearing disposed around the shaft adjacent the gear; the at least one bearing having an inner engaging surface engaged with the shaft and an outer engaging surface engaged with the housing wherein the outer engaging surface includes a sealing member engaging the housing.

2. The mechanism of claim 1 wherein the sealing member is an adhesive.

3. The mechanism of claim 1 wherein the sealing member is a plastic ring.

4. The mechanism of claim 3 wherein the plastic ring is a rubber O-ring.

5. The mechanism of claim 1 wherein the outer engaging surface conforms to the shape of the housing.

6. The mechanism of claim 1 wherein the at least one bearing is a roller bearing.

7. The mechanism of claim 1 wherein the at least one bearing is formed from a plastic material having a low coefficient of friction.

8. The mechanism of claim 1 further comprising a cap engaged with the housing over the gear, the cap including a central opening aligned with the gear.

9. The mechanism of claim 8 wherein the cap is sealingly engaged with the housing.

10. The mechanism of claim 1 wherein the gear and the shaft are integrally formed.

11. A ratchet mechanism comprising:
   A) a housing;
   B) a gear disposed within the housing;
   C) a shaft operably connected to the gear and extending into the housing;
   at least one pawl disposed at least partially within the housing and selectively engageable with the gear;

E) a first bearing disposed around the shaft adjacent the gear; and

F) a second bearing disposed around the shaft and spaced from the gear, wherein the first bearing and the second bearing each have an inner engaging surface engaged with the shaft and an outer engaging surface engaged with the housing.

12. The mechanism of claim 11 wherein the first bearing and the second bearing are each positioned within the housing.

13. The mechanism of claim 11 wherein the first bearing and the second bearing are similarly shaped.

14. A fluid tight ratcheting mechanism comprising:
a) a housing;
b) a shaft with a first end disposed within the housing and a second end located opposite the first end;
c) a gear operably connected to the second end;
d) a least one pawl engaged with the housing and selectively engageable with the gear;
e) at least one bearing disposed around the shaft adjacent the gear, the at least one bearing including an inner engaging surface contacting the shaft and an outer engaging surface sealingly engaging the housing; and
f) a cap rotatably and sealingly secured to the housing, the cap including a central opening concentrically aligned with the gear.

15. The mechanism of claim 14 further comprising:
a) the first bearing disposed on the shaft adjacent the gear and having a first inner engaging surface and a first outer engaging surface, the first bearing including a first sealing member disposed on the first outer engaging surface; and
b) a second bearing disposed on the shaft adjacent the first bearing and including a second inner engaging surface and a second outer engaging surface, the second bearing including a second sealing member disposed on the second outer engaging surface.

16. The mechanism of claim 15 wherein the first sealing member and the second sealing member are selected from the group consisting of: an adhesive, a wave washer, a plastic ring, and a rubber O-ring.

17. The mechanism of claim 15 wherein the first bearing and the second bearing are spaced from one another on the shaft.

18. The mechanism of claim 14 further comprising a third sealing member disposed within the cavity opposite the cap, the third sealing member engaged with the housing.

19. The mechanism of claim 14 further comprising a fourth sealing member secured to the cap and engageable with the housing around the periphery of the cavity.

* * * * *